(12) United States Patent
Kuczynski (10) Patent No.: US 6,356,686 B1
(45) Date of Patent: Mar. 12, 2002

(54) OPTOELECTRONIC DEVICE ENCAPSULANT

(75) Inventor: Joseph Paul Kuczynski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,779

(22) Filed: Sep. 3, 1999

(51) Int. Cl.[7] ................................................. G02B 6/26
(52) U.S. Cl. ............................. 385/39; 385/14; 385/52; 385/88; 385/92
(58) Field of Search ............................. 385/14, 49, 50, 385/52, 88, 89, 90, 92, 93, 39

(56) References Cited

U.S. PATENT DOCUMENTS

| | | | |
|---|---|---|---|
| 4,047,045 A | * | 9/1977 | Paxton, Jr. et al. .......... 250/551 |
| 5,202,943 A | | 4/1993 | Carden et al. |
| 5,241,614 A | | 8/1993 | Ecker et al. |
| 5,389,578 A | * | 2/1995 | Hodson et al. .............. 437/209 |
| 5,537,504 A | | 7/1996 | Cina et al. |
| 5,604,831 A | | 2/1997 | Dittman et al. |
| 5,631,991 A | | 5/1997 | Cohen et al. |
| 5,715,338 A | * | 2/1998 | Sjolinder et al. .............. 385/14 |
| 5,781,682 A | | 7/1998 | Cohen et al. |
| 5,812,571 A | * | 9/1998 | Peters .......................... 372/36 |
| 5,818,990 A | * | 10/1998 | Steijer et al. ................. 385/49 |
| 6,056,448 A | * | 5/2000 | Sauter et al. ................. 385/92 |

* cited by examiner

Primary Examiner—John D. Lee
Assistant Examiner—Jennifer Doan
(74) Attorney, Agent, or Firm—Schmeiser Olsen & Watts (57) ABSTRACT

An optically clear encapsulant for optoelectronic packages exhibits a suitably high viscosity both to replace a silicon nitride passivation layer required on a VCSEL die and to fill a gap between the die and an optical coupler, preventing light signal degradation. The encapsulant exhibits optical transparency to light having a wavelength of about 850 nanometers (nm) with substantially no Mie scattering since particulate fillers are not required to modulate viscosity in the encapsulant. Also, the encapsulant further seals wire bonds between the die and a cable header to prevent abrasive wear. The gap-filling encapsulant is particularly suitable for use with vertical cavity surface emitting laser (VCSEL) technology. The encapsulant includes prior to curing, a difunctional acrylate epoxy resin exhibiting pseudoplastic flow and a viscosity of greater than about $0.7 \times 10^6$ centipoise. Accordingly, a method of manufacturing an optical subassembly may eliminate a separate passivation step and instead fill the gap between the die and optical coupler with an optically clear encapsulant.

21 Claims, 4 Drawing Sheets

OPTOELECTRONIC DEVICE ENCAPSULANT

BACKGROUND OF THE INVENTION

1. Technical Field

This invention relates generally to the field of optoelectronic device manufacturing and, more specifically, to encapsulants for optoelectronic devices, such as vertical cavity surface emitting laser (VCSEL) devices.

2. Background Art

Development of improved fiber optic data interconnects has been a goal within the optoelectronics industry. The need for increasing the rate at which information is passed between computers or between a computer and a peripheral device has been steadily rising. In the past, high speed interconnection has been accomplished to a certain extent with copper wire cables. These cables often include multiple wires with the wires being single conductors, bundled or in a ribbon configuration, coaxial cables, etc. and may be shielded to reduce electromagnetic interference (EMI) in a variety of ways.

Nevertheless, several disadvantages exist with current high speed copper wire cables that are driving a transition away from copper wires to fiber optic technology. First, it is desirable to provide a large number of parallel conductors within a cable for certain applications, but the size of cables and connectors in copper wire technology are becoming unacceptably large. Second, copper wire cables radiate radio frequency power and the radiation can be difficult to control during high speed data transmission. Further, such cables are also susceptible to picking up radio frequency signals from external noise sources that are difficult to minimize. Third, high speed copper wire cables are rather costly, thus, providing a cable of sufficient length for applications currently contemplated can be cost prohibitive.

Parallel fiber optic data interconnects offer the potential of providing low cost, compact, low EMI, high speed data transmission over suitable distances. Typically, a parallel optoelectronic package includes a receiver and a transmitter interfaced with separate optical fibers even though a single optical fiber has the potential to provide simultaneous, bidirectional communication. The receiver further includes a semiconductor die with light detectors such that light signals may be received through optical fiber and converted to electrical signals for use by the receiving computer or peripheral. A transmitter is similar except that it includes a semiconductor die with light sources such that electrical signals from the transmitting computer or peripheral may be converted to a light signal and transmitted through optical fiber. A variety of light emitting diodes (LEDs) and lasers are used as light sources, however, one particularly promising light source is a vertical cavity surface emitting laser (VCSEL). Multiple patents and technical publications exist which explain VCSEL technology and its potential uses in fiber optic data interconnects. Nevertheless, challenges have been encountered with incorporating VCSEL technology into parallel optoelectronic packages.

Parallel optoelectronic packages require alignment of a VCSEL array, or another array of light sources, and a light detector array to optical couplers. The optical coupler of a transmitter receives light generated by the VCSEL array and channels light from each VCSEL to an individual optical fiber in a transmission cable. Similarly, the optical coupler of a receiver channels light from individual optical fibers in a transmission cable to each light detector in the light detector array. One suitable configuration for a transmitter consists of a semiconductor die with a VCSEL array bonded to a gold/nickel-plated metal carrier to dissipate thermal energy generated by the lasers. Depending on the nature of the VCSEL array, the semi conductor lasers often require a passivation layer, such as silicon nitride, to provide environmental protection. Precise alignment of the VCSEL array to the optical coupler is critical for adequate performance of the device. Alignment is often accomplished by means of precision stages driven by an appropriate alignment algorithm, such as available from National Instruments in Austin, Tex. Once alignment is complete the optical coupler is secured to the die carrier in any of a variety of manners known to those skilled in the art.

Process considerations dictate that a gap exist between the VCSEL array and optical coupler, often amounting to about 100 micrometers. Such a gap is sufficiently large to allow extraneous debris or subsequent process chemicals to enter the gap, resulting in interfering accumulations of matter forming in the gap. It is a disadvantage that a gap exists between the VCSEL array and optical coupler since degradation of light signals occurs as a result of accumulations in the gap. Accordingly, it would be an improvement in the art to provide an optoelectronic package that functions as desired, yet does not produce signal degradation in the manner described.

DISCLOSURE OF INVENTION

According to the present invention, an optoelectronic package is provided including a substrate having an array of one or more sources or detectors for generating or receiving a light signal, respectively, an optical coupler aligned with the array, and an optically transparent substrate encapsulant in contact with the substrate that substantially fills a gap between the substrate and optical coupler. The encapsulant provides the advantage of both passivating the sources or detectors and preventing interfering accumulations of matter from forming in the gap without degradation of the light signal. By way of example, the encapsulant may exhibit optical transparency to light having a wavelength of about 850 nanometers with substantially no Mie scattering. Further, the encapsulant is particularly suitable in an optoelectronic package wherein the sources are vertical cavity surface committing lasers (VCSELs). The encapsulant may also provide the advantage of further sealing wire bonds from the substrate to a cable header to avoid abrasive wear.

An encapsulant is also provided which includes, prior to curing, a functionalized resin and an effective amount of a curing initiator, wherein the encapsulant is adapted to passivate an optoelectronic source. Examples of a suitable encapsulants exhibit pseudoplastic flow prior to curing and may also exhibit a viscosity of greater than about $0.7 \times 10^6$ centipoise prior to curing. The functionalized resin may be a difunctional acrylated epoxy resin.

The present invention also involves a method of manufacturing an optical subassembly including the steps of: affixing a non-passivated die with an array of sources or detectors to a die carrier, aligning an optical coupler with the array, dispensing an encapsulant on at least the array, and curing the encapsulant. Additionally, the cured encapsulant may substantially fill a gap between the die and optical coupler to prevent interfering accumulations of matter from forming in the gap. Also, the step of dispensing may include further dispensing the encapsulant on wire bonds from the die to a cable header.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

MODE(S) FOR CARRYING OUT THE INVENTION

According to a preferred embodiment of the present invention, an optically clear encapsulant exhibiting a suitably high viscosity has been discovered that may be combined with a photo initiator both to replace a silicon nitride passivation layer required on a VCSEL die and to fill the gap between the die and an optical coupler, preventing light signal degradation. Thus, an optoelectronic package is provided that includes a substrate having an array of one or more sources or detectors, the sources or detectors adapted, respectively, to generate or receive a light signal, an optical coupler aligned with the array, and an optically transparent substrate encapsulant in contact with the substrate that substantially fills a gap between the substrate and optical coupler. Due to the properties of the encapsulant, it both passivates the sources or detectors and prevents interfering accumulations of matter from forming in the gap without degradation of the light signal. Preferably, the encapsulant exhibits optical transparency to light having a wavelength of about 850 nanometers (nm) with substantially no Mie scattering. This is possible because particulate fillers are not required to modulate viscosity in the encapsulant. Also, preferably the encapsulant further seals wire bonds between the substrate and a cable header to prevent abrasive wear. The gap-filling encapsulant is particularly suitable for use with vertical cavity surface emitting laser (VCSEL) technology.

As another preferred embodiment, an encapsulant for an optoelectronic source is additionally provided that comprises, prior to curing, a functionalized resin and an effective amount of a curing initiator, wherein, after curing the encapsulant exhibits optical transparency to light having a wavelength of about 850 nm with substantially no Mie scattering and passivates the optoelectronic source. Preferably, prior to curing, the encapsulant exhibits pseudoplastic flow and the functionalized resin exhibits a viscosity of greater than about $0.7 \times 10^6$ centipoise. After curing, the encapsulant preferably becomes thermally stable to subsequent solder balling operations, adheres to gold or other metal layers suitable for tape automated bonding (TAB), and exhibits a low moisture permeation rate. More preferably, the resin is a difunctional acrylated epoxy resin and exhibits a viscosity of about $1.2 \times 10^6$ centipoise prior to curing.

A method of manufacturing an optical subassembly is further provided including the following steps: affixing a non-passivated die to a die carrier, aligning an optical coupler with the array, dispensing an encapsulant on at least the array, and curing the encapsulant, wherein the cured encapsulant exhibits optical transparency and passivates sources or detectors in an array on the die. Preferably, the cured encapsulant also substantially fills a gap between the die and optical coupler and prevents interfering accumulations of matter from forming in the gap. Also, preferably the step of curing includes exposing the encapsulant to ultraviolet radiation.

Figure 1:
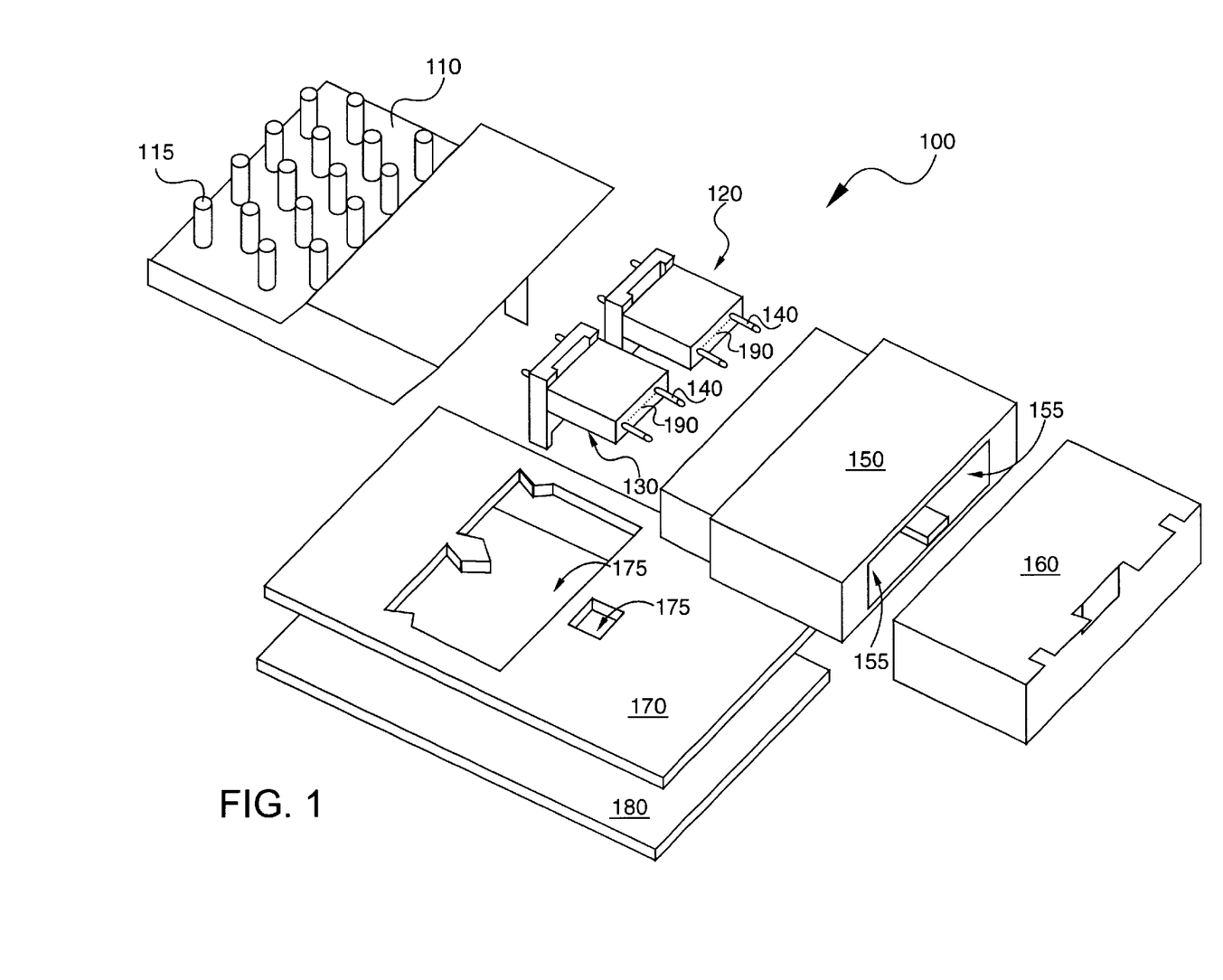
FIG. 1 is an exploded view of a parallel optical subassembly (OSA)

Turning now to FIG. 1, an exploded view of a VCSEL parallel optical subassembly (OSA) 100 is shown. VCSEL parallel OSA 100 includes a heat sink 110, a transmitter 120, a receiver 130, a retainer 150, an EMI shield 160, a overmold 170, and a laminate 180. Transmitter 120 and receiver 130 are described in more detail in FIGS. 2–4 and the associated text below, however, FIG. 1 shows four coupler pins 140 extending outward to enable alignment of transmitter 120 and receiver 130 with retainer 150. Although not shown, alignment holes are provided in the side of retainer 150 opposing transmitter 120 and receiver 130 for receiving coupler pins 140. Retainer 150 includes cable sockets 155 for receiving cable plugs (not shown) installed at the end of optical fiber cables (not shown). Transmitter 120 and receiver 130 also include optical fibers 190 the ends of which are apparent upon viewing the face of transmitter 120 and receiver 130 between coupler pins 140. Although not apparent from FIG. 1, the VCSELs of a die within transmitter 120 generate light signals that are transmitted through optical fibers 190. Retainer 150 serves the purpose of aligning light signals from optical fibers 190 with the optical fibers in the cable plugs inserted into cable sockets 155. When optical fibers 190 are properly aligned with the an optical fiber cable, the light signal from a VCSEL in transmitter 120 passes through optical fibers 190 and into the optical fiber cable aligned therewith in retainer 150. Receiver 130 functions similarly to transmitter 120 except that light signals are transmitted from the optical fiber cable through optical fibers 190 and detected by light detectors on the surface of a die (not shown) within receiver 130.

Also shown in FIG. 1 is heat sink 110 which includes multiple pillars 115 for radiating heat away from transmitter 120 and receiver 130 to prevent overheating. EMI shield 160 is provided to reduce problems with electromagnetic interference (EMI). Overmold 170 includes alignment holes 175 for receiving mating portions of the components described above such that heat sink 110, transmitter 120, receiver 130, retainer 150, and EMI shield 160 may be aligned and inset into overmold 170. Such a structure assists in keeping the various components in proper alignment, which is critical in optoelectronic technology. Laminate 180 provides a mechanism (not shown), such as soldered connections to a flex cable, that allows transmitter 120 and receiver 130 to be electrically linked therewith. Laminate 180 additionally includes a mechanism (not shown), such as a ball grid array (BGA), to electrically link OSA 100 to other components of a computer or peripheral device. By this means, electrical signals from the computer or peripheral device may be transmitted to transmitter 120 and converted to light signals and light signals received by receiver 130 may be converted to electrical signals and transmitted to the computer or peripheral device. Heat sink 110, retainer 150, EMI shield 160, overmold 170, and laminate 180 may be provided with a structure different than that shown and described in association with FIG. 1. It is preferred that these elements perform the functions described herein and the functions known to those skilled in the art to be important in providing a properly operating VCSEL parallel OSA 100 or another optoelectronic device within the scope of the invention.

Figure 2:
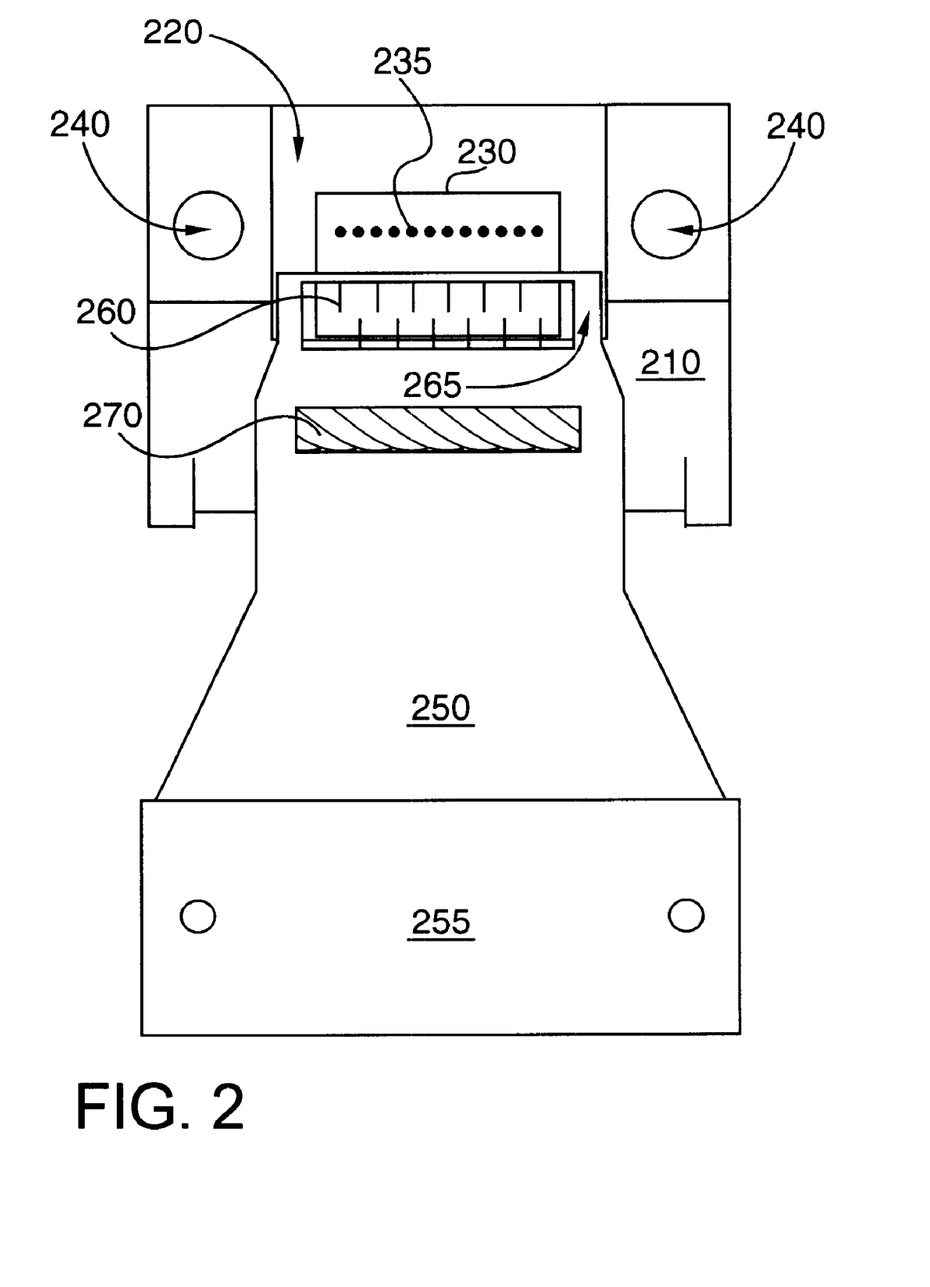
FIG. 2 is front view of the vertical cavity surface emitting laser (VCSEL) die and die carrier in FIG. 1, additionally showing a flex cable.

Turning now to FIG. 2, a front view of a die carrier 210 and a VCSEL die 230, as they would appear in transmitter 120 of FIG. 1, are shown connected to a flex cable 250. Notably, flex cable 250 is not shown in FIG. 1 to simplify the drawing, however, some sort of electrical connection between laminate 180 and transmitter 120 or receiver 130 is required. Preferably, such electrical connection is flexible, but any proper apparatus known to those skilled in the art is suitable. FIG. 2 shows that carrier 210 includes a recess 220 for receiving die 230. Carrier 210 is preferably a gold/nickel-plated metal carrier capable of dissipating the thermal energy generated by the VCSELs to avoid heat damage. Die 230 is preferably secured to carrier 210 with a suitable adhesive. It may be desirable to use an electrically conductive adhesive to provide a ground path to carrier 210. Other means for securing die 230 to carrier 210 may also be acceptable.

Even though the preferred embodiment of the present invention provides a VCSEL die 230, the die positioned in recess 220 may be any substrate needed in an optoelectronic package, whether it be a substrate with an array of sources for generating a light signal or an array of detectors for receiving a light signal. The invention is applicable to any optoelectronic package wherein a gap exists between the substrate and an optical fiber and the need exists to prevent interfering accumulations of matter from forming in the gap without degradation of the light signal. The invention is also applicable to any optoelectronic package wherein an encapsulant is needed to passivate the sources or detectors on the substrate. The array may include one or more sources or detectors, or perhaps a combination of sources and detectors. FIG. 2 shows twelve VCSELs 235 (sources) arranged in a 1×12 array on die 230. Notably, VCSELs 235 are enlarged in FIG. 2 beyond their normal scale in comparison to the size of die 230 so as to be readily visible.

Figure 3:
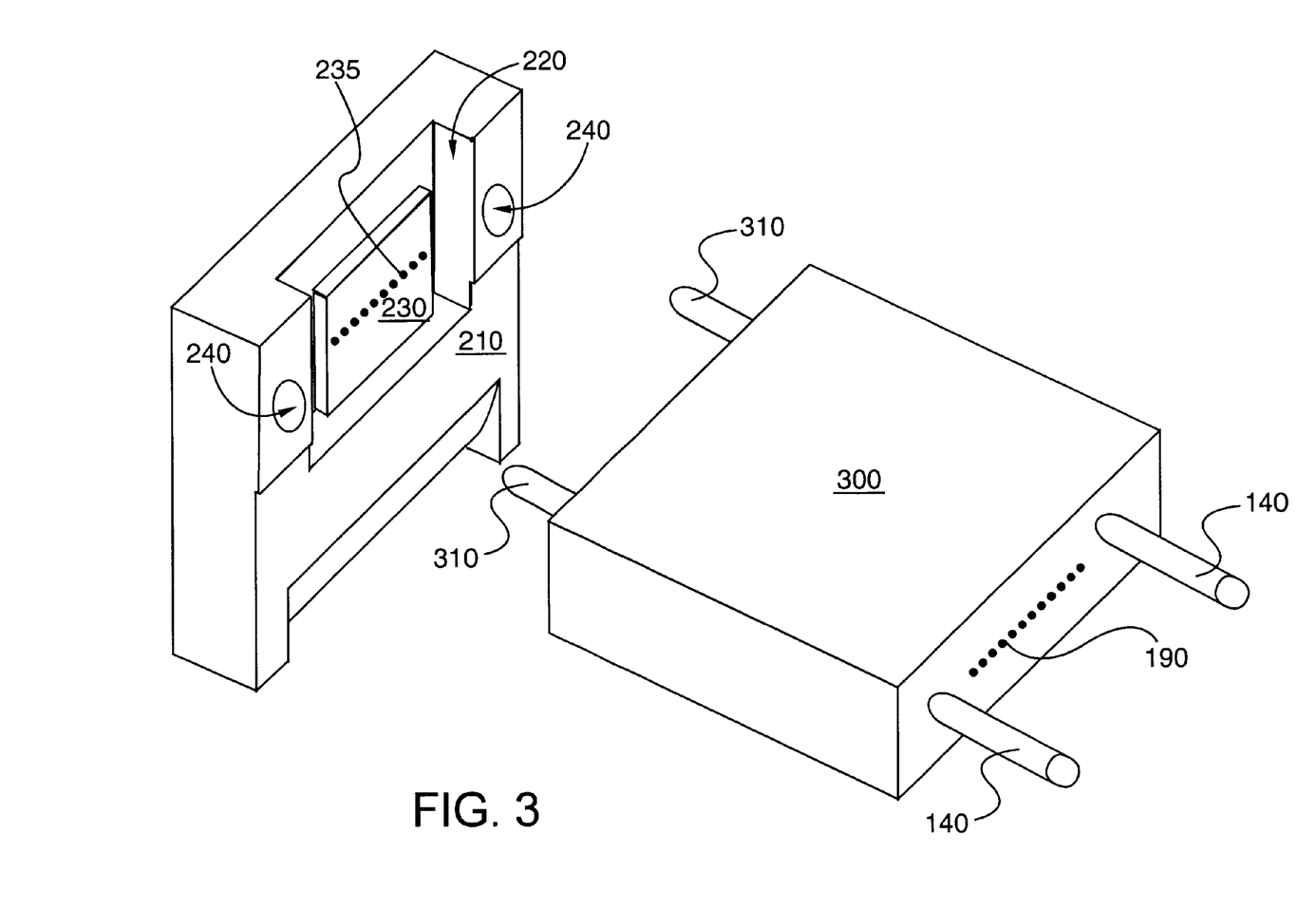
FIG. 3 is an exploded view of the apparatus in FIG. 2 in combination with an optical coupler.

FIG. 2 further shows alignment holes 240 in die 230 for receiving coupler pins 310 (shown in FIG. 3). A flex cable 250 is provided to enable electrical connection of die 230 to laminate 180. Flex cable 250 is connected to contact pads (not shown) on die 230 by multiple wire bonds 260. The region of flex cable 250 from which wire bonds extend to die 230 is termed a header 265. Header 265 is preferably at one end of flex cable 250. The end of flex cable 250 opposite header 265 is linked to a stiffener 255 which is, in turn, linked to laminate 180. Stiffener 255 is preferably a plug-in-socket type of connector allowing transmitter 120 or receiver 130 to be replaced in OSA 100 as necessary. Alternatively, stiffener 255 may simply be a soldered connection of flex cable 250 directly to laminate 180, although this is not preferred. Also, flex cable 250 is preferably linked to carrier 210 by a strain relief 270 to prevent undue stress on wire bonds 260 since the polymer coated wiring within flex cable 250 is much more durable then the fine wires forming wire bonds 260. Strain relief 270 may be any mechanism known to those skilled in the art that links flex cable 250 to carrier 210 such that flexing or pulling of flex cable 250 results in a strain occurring at the point of strain relief 270 rather than at wire bonds 260.

As shown in FIG. 3, transmitter 120 also includes optical coupler 300 for receiving light signals generated by VCSELs 235 on die 230. Alignment holes 240 receive coupler pins 310 to roughly align optical fibers 190 in optical coupler 300 with VCSELs 235. Alignment of optical fibers 190 with VCSELs 235 is critical to ensure that light signals are properly transmitted to an optical fiber cable (not shown). Thus, alignment holes 240 are oversized to allow precise alignment by orienting coupler pins 310 to a proper position within alignment holes 240. Alignment is accomplished by means of precision stages driven by an appropriate alignment algorithm, as known to those skilled in the art. Once alignment is verified and complete, optical coupler 300 is secured to carrier 210 with a suitable adhesive. Process considerations dictate that a gap of greater than about 50 micrometers exists between VCSELs 235 on die 230 and optical fibers 190 in optical coupler 300. Preferably, the gap is approximately 100 micrometers. Such is the preferred gap distance for transmitter 120 as described herein according to a preferred embodiment of the present invention, however, another gap distance may be appropriate for a receiver, including receiver 130, or a transmitter having a different source for light signals. Notably, the depth of recess 220 in carrier 210 is greater than the thickness of die 230. Accordingly, a gap will exist between the face of optical coupler 300 that meets with carrier 210 and the surface of die 230 when optical coupler 300 is joined to carrier 210.

Figure 4:
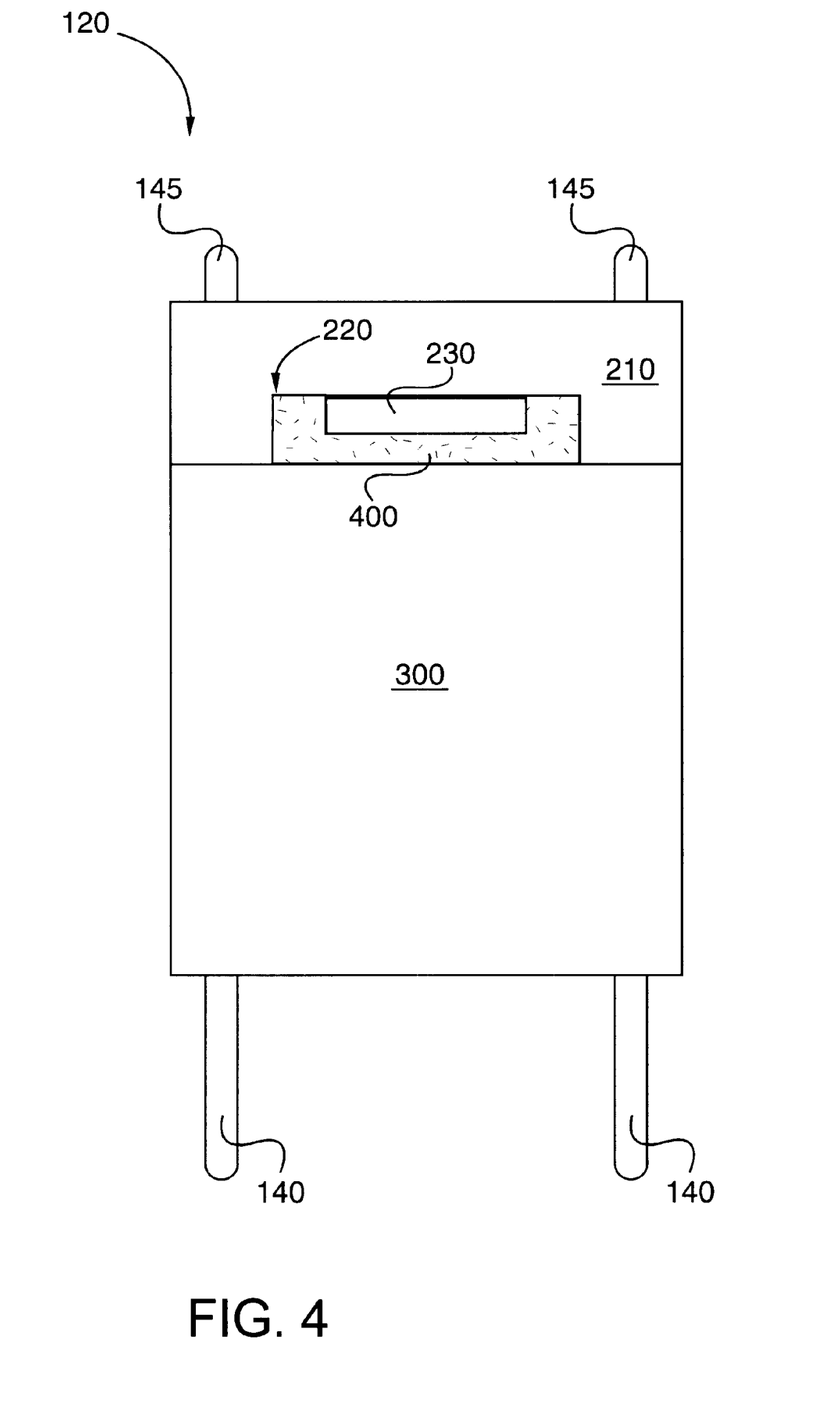
FIG. 4 is a top view of the VCSEL die, die carrier, and optical coupler shown in FIG. 1.

To prevent interfering accumulations of matter from forming in the gap, an optically transparent substrate encapsulant 400 is preferably dispensed into the gap between die 230, or another substrate, and optical coupler 300, as shown in FIG. 4. After being dispensed, encapsulant 400 is cured in the gap to additionally passivate VCSELs 235, or other sources or detectors on an alternate substrate. Essentially, encapsulant 400 forms a hermetic seal over die 230 and fills the gap between die 230 and optical coupler 300 to prevent entry of extraneous debris or any process chemicals used in subsequent fabrication of OSA 100. Accordingly, a method of manufacturing OSA 100 may eliminate a separate passivation step and instead fill the gap between die 235 and optical coupler 300 with encapsulant 400.

While it is preferred that encapsulant 400 forms both a passivation layer over VCSELs 235 and a gap fill material, it is conceivable that die 235 could first be passivated using a silicon nitride deposition process, or other suitable process. In such case, encapsulant 400 would function only as a gap fill material. Also, FIG. 4 shows that encapsulant 400 completely fills the gap between die 230 and optical coupler 300 as well as another gap between recess 220 and optical coupler 300. It is only necessary that encapsulant 400 substantially fills the gap such that it bridges VCSELs 235 to optical fibers 190. In this manner, light signals generated by VCSELs 235 may be transmitted to optical fibers 190 without interference from accumulations of matter that may form in the gap. In addition, it has been discovered that an increase in coupled power between VCSELs 235 and optical fibers 190 occurs when encapsulant 400 substantially fills the gap as indicated. Although the cause is uncertain, one theory is that some sort of lens effect occurs, improving the transmission of light signals compared to an unfilled gap.

The same conditions would also hold true for receiver 130, wherein transmission is required from optical fibers 190 to detectors on the surface of a die (not shown) within receiver 130. Further, it is also conceivable that no passivation of die 230 would be required except for VCSELs 235 and, thus, application of encapsulant 400 only between VCSELs 235 and optical fibers 190 would also constitute acceptable passivation. As is apparent upon viewing FIG. 2 discussed above, wire bonds 260 extend from header 265 of flex cable 250 to contact pads (not shown) on die 235. Wire bonds 260 are often quite delicate and may require encapsulation for protection from environmental conditions or other damage. Accordingly, it may also be advantageous, according to the present invention, to apply a sufficient amount of encapsulant 400 such that at least a portion of wire bonds 260 are also encapsulated.

The physical property requirements of encapsulant 400 will depend upon its function in a particular application. For transmitter 120, it is preferred that encapsulant 400 be optically transparent. In particular, it is more preferred that encapsulant 400 be optically transparent to light having a wavelength of about 850 nanometers with substantially no Mie scattering. Mie scattering refers to scattering of light by a particle of any size, as opposed to Raleigh scattering which refers to scattering of light by objects that are small in comparison to wavelength. Particles in Mie scattering are not necessarily limited to solid particles and additionally include colloidal and metallic suspensions, water droplets, etc.

It is additionally preferred that encapsulant 400 exhibit pseudoplastic flow prior to curing. That is, encapsulant 400 should be a "sheer thinning" substance such that as sheer force is applied to the fluid its viscosity decreases, but when sheer force is removed the viscosity increases back to its normal state. It is also preferred that after being cured encapsulant 400 exhibits thermal stability during application of heat in subsequent processing steps, such as formation of soldered connections. In particular, it is more preferred that encapsulant 400 exhibit thermal stability up to about 215° C. or the approximate reflow temperature of the solder used in OSA 100. It is further preferred that encapsulant 400 will sufficiently adhere to gold or other metal layers suitable for tape automated bonding (TAB), such as the gold-nickel coating preferably on carrier 210 as described above. Sufficient adherence to carrier 210 improves the effectiveness of encapsulant 400 as a hermetic seal. One objective of a hermetic seal is to prevent the intrusion of moisture. Accordingly, it is also important that encapsulant 400 exhibit a low moisture permeation rate. It is preferable that moisture permeation occurs at a rate less than about 7 (gram× milliinches)/(24 hours×100 square inches) (g–mil/24 hr–100 in$^2$).

Several commercially available materials have been identified that, to a certain extent, are capable of meeting some of the physical property requirements for encapsulant 400. However, a preferred composition according to the present invention has been identified that excels in meeting each of the physical properties described above. One particular problem with commercially available materials is that they cannot meet a rheology requirement while still remaining optically transparent. That is, it is preferred that encapsulant 400 exhibit a viscosity of greater than about $0.7 \times 10^6$ centipoise prior to curing, and it is more preferable that viscosity equals about $1.2 \times 10^6$ centipoise. Since encapsulant 400 will be applied prior to final alignment, which may require up to approximately 60 seconds to complete, the flow properties are preferably tailored to prevent encapsulant sag. Further, it is desirable that encapsulant 400 be capable of curing quickly, such as by photo curing. Conventional heat curing may potentially decrease the viscosity as temperature increases or may be too slow, in either case, introducing the possibility of encapsulant sag. Unwanted sag may produce a condition where encapsulant 400 does not properly bridge the gap between VCSELs 235 and optical fibers 190 or passivate an intended area.

One method of adjusting flow properties of an encapsulant is to add an inert filler, such as fumed silica. Fumed silica is transparent to ultraviolet light and low loading levels are usually sufficient to achieve the desired viscosity. Nevertheless, the cure speed, or photo speed, of a photo curable encapsulant may be adversely affected by the incorporation of an inert filler. In addition, if encapsulant 400 is applied to wire bonds 260, then it is probable that an inert filler may abrade wire bonds 260. Furthermore, the particle diameter of the smallest known commercially available fumed silica is substantially greater than the preferred wavelength produced by VCSELs 235, namely 850 nanometers, as well as most other laser-generated light. Accordingly, Mie scattering will likely reduce optical throughput, degrading the light signal. To circumvent these problems, a high viscosity, photo curable, wholly organic encapsulant material is desired. Use of such a material would eliminate any reduction in cure speed, degradation in optical throughput (via scattering), and any potential abrasive wear of wire bonds 260.

According to the present invention, encapsulant 400 preferably comprises, prior to curing, a functionalized resin and an effective amount of a curing initiator. Encapsulant 400 preferably exhibits optical transparency after curing to light having a wavelength of about 850 nanometers with substantially no Mie scattering. More preferably, a photo initiator is used such that encapsulant 400 is photo curable, most preferably by ultraviolet exposure. A variety of photo initiators may be suitable, including those operating by a free radical or cationic reaction mechanism. If encapsulant 400 exhibits pseudoplastic flow, then it may be dispensed easily through a small orifice, such as a needlepoint, into a small gap, yet viscosity will increase after application (removal of sheer force) to prevent sag. A functionalized resin in combination with a curing initiator is preferred because it allows curing through a cross-linking reaction or polymerization reaction. The functional group of the resin may be an unsaturated region of the resin, an epoxy group, a double bond functionality, or other functional groups. More preferably, the resin comprises a difunctional acrylated epoxy resin, such as RADCURE(R) EBECRYL(R) 3700 available from UCB Chemicals in Smyrna, Ga. EBECRYL (R) 3700 exhibits an inherent viscosity of $1.2 \times 10^6$ centipoise and may be combined with a variety of photo initiators to allow photo curing. Combination with a free radical photo initiator has been shown to be curable upon a 20 seconds exposure to 4500 milliwatt/square centimeter (cm$^2$) (90 Joule/cm$^2$) of ultraviolet radiation. It is unusual that a difunctional acrylated epoxy resin exists that would be suitable in the present invention since the majority of difunctional acrylated monomers are free flowing liquids.

Encapsulant sag was evaluated for EBECRYL(R) 3700 as well as a variety of other compositions and is displayed in TABLE 1 below. Each sample evaluated contained approximately 1% of a free radical photo initiator, except for the Dymax compositions which are purchased containing a proprietary amount of initiator between 1–5%. Evaluation consisted of dispensing a dollop of material on a glass slide, holding the slide vertical for 60 seconds, and then determining the distance the material flowed as an approximate measure of sag. Dymax 9001 v.3.1 and Dymax 9001 are available from Dymax Corp. in Torrington, Conn. TABLE 1 shows that Dymax 9001 v.3.1 and Dymax 9001 exhibited a sag of 7 millimeters (mm) and 4 mm, respectively. For samples A, B, and C, a formulation of Dymax 9001 and fumed silica was prepared at the loading levels indicated. Sample C revealed that approximately 3.0 weight percent fumed silica appears to be the minimum loading level necessary to achieve the proper rheology that will avoid encapsulant sag. As discussed above, fumed silica fillers are not preferable in the present invention. Sample D constituted a mixture of Dymax 9001 with 22.5 weight percent EBECRYL(R) 3700 and exhibited a 25% reduced encapsulant sag compared to Dymax 9001 alone. Even though sample D, did not contain fumed silica, any amount of sag was deemed less preferable. Accordingly, sample E was prepared from EBECRYL(R) 3700 alone and exhibited zero sag. Sample E* is the same as sample E after a vertical hold of 120 seconds.

TABLE 1

| Sample ID | Wt % Silica | Wt % 3700 | Sag |
|---|---|---|---|
| 9001 v.3.1 | — | — | 7 mm |
| 9001 | — | — | 4 mm |
| A | 1.0 | — | 4 mm |
| B | 2.0 | — | 2 mm |
| C | 3.0 | — | 0 mm |
| D | — | 22.5 | 3 mm |
| E | — | 100 | 0 mm |
| E* | — | 100 | 0 mm |

Next, test VCSELs were encapsulated with samples D and E by ultraviolet photo curing and the power-current-voltage curves were evaluated and referenced to power-current-voltage performance when not encapsulated. The VCSEL wavelength generated remained unchanged, the threshold current increased slightly (reason unknown), and both the efficiency and operating current at higher power improved. Accordingly, proper passivation of the test VCSELs was demonstrated as well as an organic, zero sag encapsulant that will not produce Mie scattering.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation. Similarly, unless otherwise specified, any sequence of steps of the method indicated in the drawings or herein are given as an example of a possible sequence and not as a limitation.

What is claimed is:

1. An optoelectronic package comprising:
   a) a substrate having an array of one or more sources or detectors, the sources or detectors adapted, respectively, to generate or receive a light signal;
   b) an optical coupler aligned with the array such that a gap is formed between the optical coupler and the array of one or more sources or detectors, wherein the light signal passes through the gap between optical coupler and the array of one or more sources or detectors during operation; and
   c) an optically transparent substrate encapsulant in contact with the substrate that substantially fills the gap between optical coupler and the array of one or more sources, wherein the encapsulant both passivates the sources or detectors and prevents interfering accumulations of matter from forming in the gap without degradation of the light signal, wherein the optically transparent comprises difunctional acrylated epoxy resin prior to curing.

2. The device of claim 1, wherein the encapsulant exhibits optical transparency to light having a wavelength of about 850 nanometers with substantially no Mie scattering.

3. The device of claim 1, wherein the sources comprise vertical cavity surface emitting lasers.

4. The device of claim 1, wherein the gap is greater than about 50 micrometers.

5. The device of claim 4, wherein the gap is about 100 micrometers.

6. The device of claim 1, further comprising wire bonds from the substrate to a cable header, wherein the encapsulant further seals the wire bonds from abrasive wear.

7. An encapsulant for an optoelectronic source comprising, prior to curing, a functionalized resin and an effective amount of a curing initiator, wherein the functionalized resin comprises difunctional acrylated epoxy resin, wherein, after curing, the encapsulant exhibits optical transparency to light having a wavelength of about 850 nanometers with substantially no Mie scattering and passivates the optoelectronic source.

8. The encapsulant of claim 7, wherein the encapsulant exhibits psuedoplastic flow prior to curing.

9. The encapsulant of claim 7, wherein the functionalized resin exhibits a viscosity of greater than about $0.7 \times 10^6$ centipoise prior to curing.

10. The encapsulant of claim 9, wherein the viscosity comprises about $1.2 \times 10^6$ centipoise.

11. The encapsulant of claim 7, wherein the initiator comprises a photo initiator.

12. The encapsulant of claim 7, wherein, after curing, the encapsulant exhibits thermal stability up to about 215° C., adheres to gold or other metal layers suitable for tape automated bonding, and exhibits a moisture permeation rate of less than about 7 (gram×milliinches)/(24 hours×100 inches$^2$).

13. A method of manufacturing an optical subassembly comprising the steps of:
   affixing a non-passivated die to a die carrier, the die having an array of one or more sources or detectors, the sources or detectors adapted, respectively, to generate or receive a light signal;
   aligning an optical coupler with the array such that a gap is formed between the optical coupler and the array of one or more sources or detectors, wherein the light signal passes through the gap between optical coupler and the array of one or more sources or detectors during operation;
   dispensing an encapsulant on at least the array, wherein the encapsulant substantially fills the gap between the optical coupler and the array of one or more sources and prevents interfering accumulations of matter from forming in the gap, wherein the encapsulant comprises difunctional acrylated epoxy resin; and
   curing the encapsulant, wherein the cured encapsulant exhibits optical transparency and passivates the sources or detectors.

14. The method of claim 13, wherein the cured encapsulant exhibits optical transparency to light having a wavelength of about 850 nanometers with substantially no Mie scattering.

15. The method of claim 13, wherein, prior to curing, the encapsulant comprises a functionalized resin, exhibiting a viscosity of greater than about $0.7 \times 10^6$ centipoise, and an effective amount of a curing initiator.

16. The method of claim 13, wherein the step of curing comprises exposing the encapsulant to ultraviolet radiation.

17. The method of claim 13, wherein the step of dispensing comprises further dispensing the encapsulant on wire bonds from the die to a cable header, wherein the encapsulant further seals the wire bonds from abrasive wear.

18. The method of claim 13, wherein the gap is greater than about 50 micrometers.

19. An optoelectronic package comprising:
   a) a die having an array of one or more vertical cavity surface emitting lasers;

b) an optical coupler aligned with the array, wherein a gap is formed between the die and the optical coupler and wherein laser signals pass through the gap during operation;

c) an optically transparent substrate encapsulant in contact with the die, the encapsulant exhibiting substantially no Mie scattering and substantially filling the gap between the die and optical coupler, wherein the optically transparent substrate encapsulant comprises difunctional acrylated epoxy resin prior to curing; and d) wire bonds from the die to a cable header, wherein the encapsulant both seals the lasers and wire bonds and prevents interfering accumulations of matter from forming in the gap.

20. An encapsulant for an optoelectronic source consisting essentially of, prior to curing, a difunctional acrylated epoxy resin and an effective amount of a curing photo initiator, wherein, prior to curing, the functionalized resin exhibits a viscosity of greater than about $0.7 \times 10^6$ centipoise and the encapsulant exhibits pseudoplastic flow and wherein, after curing, the encapsulant exhibits optical transparency to light having a wavelength of about 850 nanometers with substantially no Mie scattering and passivates the optoelectronic source.

21. A method of manufacturing an optical subassembly comprising the steps of:

affixing a non-passivated die to a die carrier, the die having an array of one or more vertical cavity surface emitting lasers;

forming wire bonds from the die to a cable header;

dispensing an encapsulant at least on the array and wire bonds, wherein the encapsulant comprises difunctional acrylated epoxy resin;

aligning an optical coupler with the array, wherein a gap is formed between the die and the optical coupler and wherein laser signals pass through the gap during operation;

curing the encapsulant by exposure to ultraviolet radiation, wherein the cured encapsulant exhibits optical transparency with substantially no Mie scattering, seals the lasers and wire bonds, substantially fills the gap between the die and optical coupler, and prevents interfering accumulations of matter from forming in the gap.

* * * * *